US007671506B2

(12) United States Patent
Kaneda et al.

(10) Patent No.: US 7,671,506 B2
(45) Date of Patent: Mar. 2, 2010

(54) BRUSH APPARATUS

(75) Inventors: Naohito Kaneda, Chiyoda-ku (JP); Koichiro Kamei, Chiyoda-ku (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 12/257,694

(22) Filed: Oct. 24, 2008

(65) Prior Publication Data

US 2009/0284097 A1 Nov. 19, 2009

(30) Foreign Application Priority Data

May 19, 2008 (JP) ............................. 2008-130967

(51) Int. Cl.
*H02K 13/00* (2006.01)

(52) U.S. Cl. ........................ 310/239; 310/242; 310/245; 310/248; 310/249

(58) Field of Classification Search ................. 310/239, 310/242, 248, 249, 245
See application file for complete search history.

(56) References Cited

U.S. PATENT DOCUMENTS 1,523,599 A * 1/1925 Lindblade ................... 310/249
5,717,271 A * 2/1998 Aoki et al. .................. 310/242
6,664,701 B1 * 12/2003 Ortt et al. .................... 310/239
6,744,170 B1 * 6/2004 Du et al. ...................... 310/242
7,256,527 B2 * 8/2007 Niimi ......................... 310/239
2004/0004409 A1 * 1/2004 Ortt et al. .................... 310/248
2004/0245886 A1 * 12/2004 Uchida ....................... 310/239

FOREIGN PATENT DOCUMENTS

JP 2606362 B2 2/1997
JP 11-178285 A 7/1999
JP 2003-79093 A 3/2003

* cited by examiner

*Primary Examiner*—Quyen Leung
*Assistant Examiner*—Leda Pham
(74) *Attorney, Agent, or Firm*—Sughrue Mion, PLLC

(57) ABSTRACT

A brush apparatus includes a brush and a brush holder. The brush includes a pigtail embedded in a wider side thereof so that the longitudinal side in cross-section of the pigtail extends in parallel with a surface of the brush coming into contact with a commutator. The brush holder includes a brush holding member, a brush spring for pressing the brush against the commutator for sliding contact, a base for holding the brush holding member and electrically connecting the same to an earth circuit, and a connection lug on the base. The brush holding member is formed with a notch on a wider side from an upper end thereof for allowing a downward movement of the pigtail when the brush wears and hence is pressed downward. A distal end of the pigtail is connected to the connection lug.

4 Claims, 2 Drawing Sheets

BRUSH APPARATUS

BACKGROUND OF THE INVENTION

1. Field of the Invention

The present invention relates to a brush apparatus used for, for example, an engine starter.

2. Description of the Related Art

In general, in order to achieve high-power and high-current in a direct current electric motor (DC electric motor) such as an engine starter, reduction of an internal electric resistance and upsizing of the electric motor are effective. As a measure for reducing the internal electric resistance, it is considered to increase a cross-sectional area of a conductor of a pigtail for the purpose of reduction of a current density and voltage drop of a lead wire which constitutes the pigtail. In order to do so, it is necessary to increase the thickness of the lead wire or to connect a plurality of the lead wires to a brush disclosed, for example, in JP-A-11-178285 and JP-A-2003-79093.

In order to increase the cross-sectional area of the conductor of the pigtail without changing the brush size for achieving the high-power and high-current of the DC electric motor in the related art, it is necessary to increase the thickness of the lead wire which constitutes the pigtail or to use a plurality of the lead wires. However, when the thickness of the lead wire increases, the finished outer diameter of the pigtail increases accordingly, and the dimensions of permissible wear from a surface of the brush, which comes into sliding contact with a commutator, to the lower end of a embedded portion of the pigtail decreases, which shortens the life of the brush. In addition, when the wear of the brush advances, the brush passes toward the commutator by a brush spring and hence moves downward in a brush holding member. However, the pigtail employing a thick lead wire has poor flexibility, which hinders the downward movement of the brush and causes a contact failure between the brush and the commutator, which may result in the voltage drop.

On the other hand, when two lead wires are embedded in the brush as shown in FIG. 4B in JP-A-2003-79093, since the positions where the two lead wires are embedded are different, the shape of a brush holder is constrained and hence a holding contact surface with respect to the brush decreases, which may result in lowering of the strength of the holding member and lowering of the holding stability. As shown in Patent Document JP-A-11-178285, when the lead wire is embedded on the opposite side of the surface which comes in sliding contact with the commutator, the brush is reliably held by the brush holder. Instead, however, there arises a necessity to avoid interference of the pigtail with respect to a bracket or the like on the outer periphery of the brush. Therefore, reduction of the brush height is necessary, and hence shortening of the brush life against the wear is unavoidable.

SUMMARY OF THE INVENTION

Accordingly, it is an object of the invention to solve the above-described problems.

A brush apparatus according to the invention includes a brush having a rectangular solid shape and coming into sliding contact with a commutator connected to an armature coil, and a brush holder that holds the brush. The brush includes a pigtail having a plurality of lead wires tightly bonded into a flat shape. The pigtail is embedded in the brush at a substantially widthwise center of a wider side thereof, which is orthogonal to a surface of the brush which comes into contact with the commutator in such a manner that the longitudinal side in cross-section of the pigtail extends in parallel with the surface of the brush which comes into contact with the commutator. The brush holder includes a brush holding member for storing the brush, a brush spring for pressing a surface of the brush opposite from the surface which comes into contact with the commutator against the commutator in order to bring the brush into sliding contact with the commutator, a base for holding the brush holding member and electrically connecting the same to an earth circuit, and a connection lug provided on the base. The brush holding member has a notch formed on a wider side thereof by trimming away the brush holding member from an upper end thereof for allowing a downward movement of the pigtail when the brush wears and hence is pressed downward. A distal end of the pigtail is connected to the connection lug.

This arrangement enables to elongate the life of the brush, and to store the brush stably in the brush holder. Since the flexibility of the pigtail is sufficiently secured, the pigtail is prevented from hindering the contact between the brush and the commutator, which improves electrical performance. In addition, the pigtail may be formed of a general-purpose member, and may be connected to the brush holding member easily, so that cost reduction is expected.

The foregoing and other objects, features, aspects, and advantages of the invention will become more apparent from the following detailed description of the invention when taken in conjunction with the accompanying drawings.

DETAILED DESCRIPTION OF THE INVENTION

Figure 1:
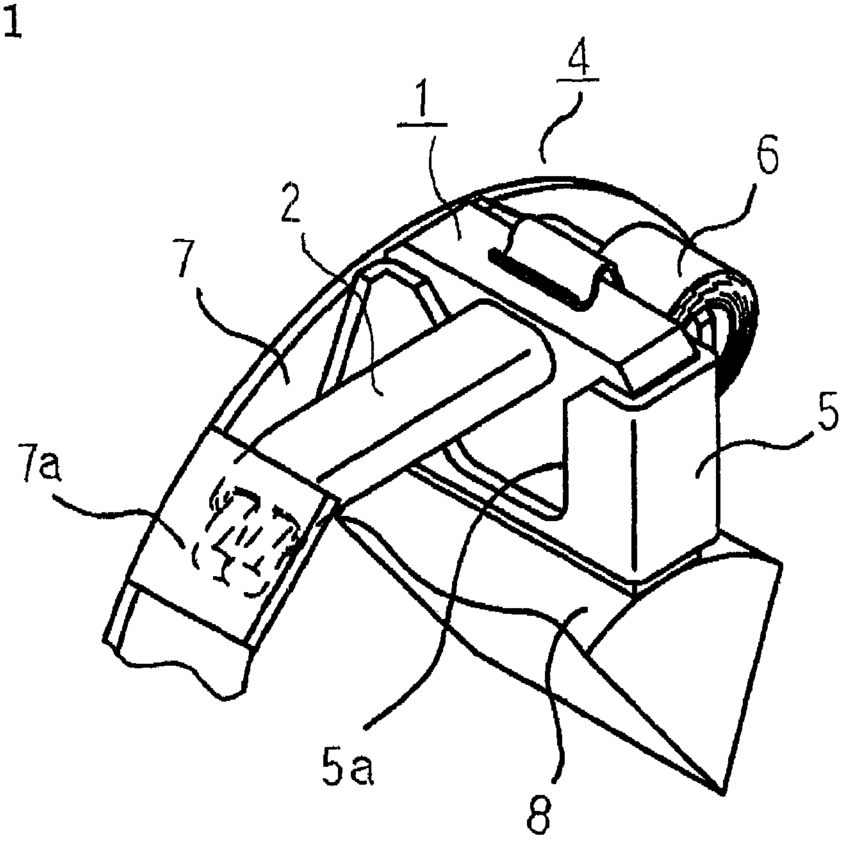
FIG. 1 is a perspective view illustrating a brush apparatus according to an embodiment of the invention.
Figure 2:
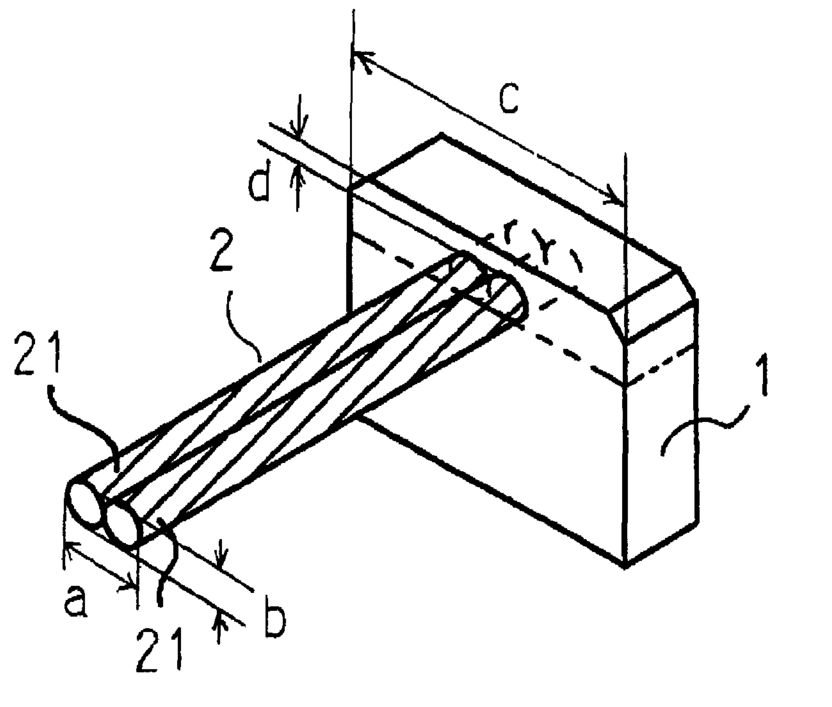
FIG. 2 is a perspective view illustrating a brush according to the embodiment.

FIG. 1 is a perspective view illustrating part of a brush apparatus of an engine starter according to an embodiment of the invention; FIG. 2 is a perspective view illustrating a brush without an insulation tube according to the embodiment of the invention; and FIG. 3 is a perspective view illustrating the brush with the insulation tube according to the embodiment of the invention.

In FIG. 1, the brush apparatus in the invention includes a brush holder 4 and a brush 1. The brush holder 4 includes a brush holding member 5 having a tubular space formed into a rectangular shape in cross section when viewed from the top. One of narrower sides of the brush holding member 5 is fixed to a base 7. The brush 1 having a pigtail 2, described later, is inserted into the brush holding member 5, and the lower end of the brush 1 is in sliding contact with a commutator 8. A brush spring 6 formed by winding a thin plate, which applies an adequate contact pressure to the commutator 8 by pressing the brush 1 from above, is attached to one of wider sides of the brush holding member 5. The brush holding member 5 is provided with a notch 5*a* at a substantially center of the other wider side thereof by trimming away from the upper end of the brush holding member 5, thereby allowing a downward movement of the pigtail 2 provided on the brush 1 when the brush 1 wears and hence is pressed downward by the brush spring 6. The distal end of the pigtail 2 is connected to a connection lug 7*a* formed integrally with the base 7 by welding or the like.

Figure 3:
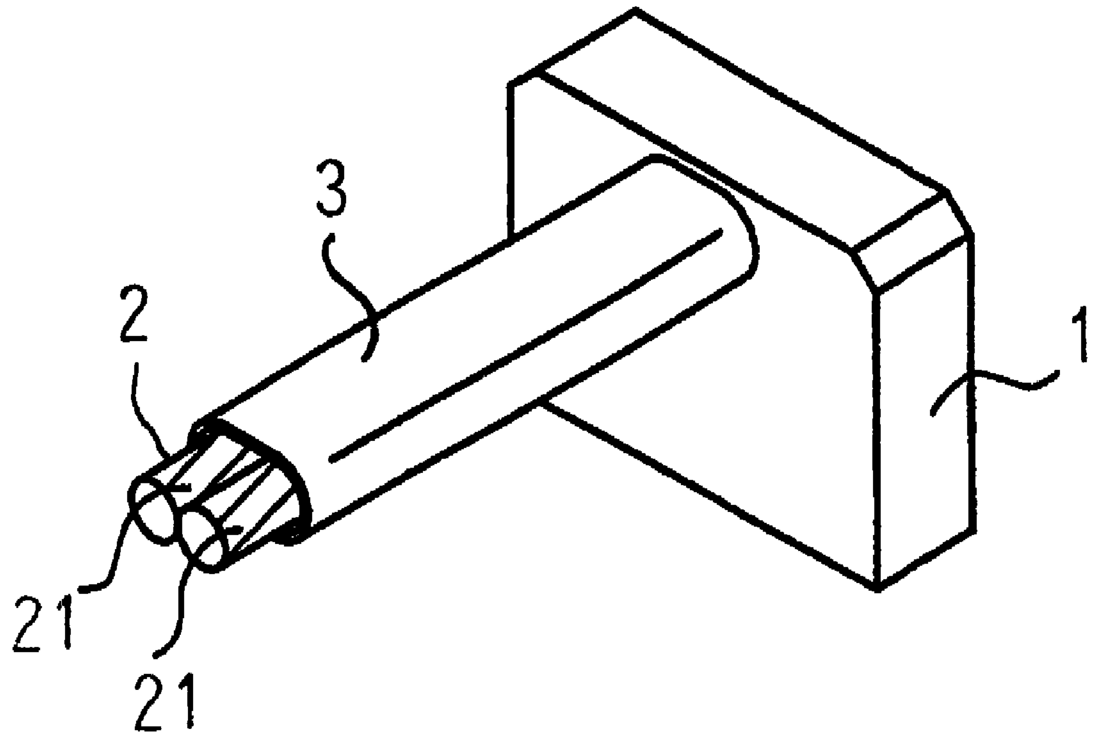
FIG. 3 is a perspective view illustrating the brush according to the embodiment.

FIG. 2 and FIG. 3 are perspective views illustrating the brush 1, respectively. The pigtail 2 is embedded in one of the wider sides of the brush 1 which is formed substantially into a rectangular solid shape. The pigtail 2 includes two lead wires 21 tightly bonded to each other. The pigtail 2 is embedded in the brush 1 in such a manner that the longitudinal direction of the cross-section thereof extends in parallel with a surface of the brush 1 which comes into contact with the commutator. When the pigtail 2 is composed of three or more lead wires, the three or more lead wires are tightly bonded to each other into a flat shape. Assuming that "a" designates a longitudinal width of a cross-section of the pigtail 2 and "c" designates the width of the brush 1 having the pigtail 2 embedded therein, the value "a" is set to be 50% or lower of the value "c". The reason is that when the value "a" exceeds 50% of the value "c", the width of the notch 5*a* to be provided on the brush holding member 5 increases and hence the side surface of the brush holding member 5 which surrounds the brush, that is, the surface areas on both sides of the notch 5*a* decrease. Consequently, it becomes difficult to stably hold the brush 1 and also it becomes difficult to maintain the strength of the brush holding member 5 by minimizing the width of the notch 5*a*.

The lead wire 21 is formed of a flexible strand wire. Assuming that reference sign "b" designates the diameter thereof, the cross-section of the pigtail 2 has a substantially elongated circle having a width of "a" (=2b) and a height of "b". In this configuration, the pigtail dimension "b" in the direction of the wear of the brush may be restrained with respect to increase in cross-sectional area of the conductor of the pigtail, which is effective for extending the permissible wear of the brush and elongating the brush life. In addition, since a generally available lead wire having a circular cross section can be used as the lead wire 21, the parts for the pigtail is easy to obtain, so that cost reduction is effectively achieved. Furthermore, since the dimension "b" in the direction of wear of the brush is relatively small with respect to the cross-sectional area of the conductor of the pigtail, flexibility of the pigtail 2 in the direction of wear of the brush 1 is larger than a pigtail having the same cross-sectional area but being formed of a single thick lead wire. Therefore, the probability of application of a stress which causes a contact failure between the brush and the commutator by the rigidity of the pigtail is reduced, which alleviates the risk of occurrence of the voltage drop between the brush and the commutator.

An end of the pigtail 2 where the respective lead wires 21 are embedded into the brush 1 is positioned near the upper end of the brush 1 at the center on the wider side of the brush 1 leaving a thickness "d" of the brush 1 which is capable of securing the embedding strength. Accordingly, elongation of the life of the brush 1 against wear is achieved.

When the pigtail 2 needs to be insulated from the periphery thereof, it is achieved by covering the two lead wires 21 together with one insulation tube 3 as shown in FIG. 3. Fixation of the distal end of the pigtail 2 is achieved by welding or brazing the two lead wires 21 to the connection lug 7*a* of the base 7 which fixes the brush holding member 5 as described above. Since the lead wires 21 are tightly bonded to each other, the welding or the brazing of the two lead wires 21 are achieved by one operation, which helps to reduce a man-hour.

Subsequently, the operation will be described. A power is distributed to the interior of the engine starter from an external power source (not shown) and a current is distributed from an armature coil (not shown) to the commutator 8 through an electric circuit. The current is then distributed to the brush 1 which is pressed by the brush spring 6 and is in sliding contact with the commutator 8, then flows from the brush 1 through the pigtail 2 and then to the base 7 through the connection lug 7*a* to which the pigtail 2 is welded. Then the current returns back to the external power source through an external terminal of an engine starter, which is connected to the base 7 (not shown) so as to be capable of distributing electricity. At the same time, the armature (not shown) generates a rotational torque and the commutator 8 rotates integrally therewith. Therefore, the brush 1, which is in sliding contact therewith, wears gradually, and is pressed more against the commutator 8 by the brush spring 6. As a result the pigtail 2 moves in the notch 5*a* toward the commutator 8. Since the brush spring 6 also moves in the same manner toward the commutator 8, a notch (not shown) which allows downward movement of the brush spring is also provided on an opposed side of the notch 5*a*.

According to the brush apparatus in the configuration as described above, the influences of the cross-sectional shape and the embedded position of the pigtail on the brush life are restrained to achieve an elongated life of the brush, and increase in total cross-sectional area of the pigtail is achieved while securing sufficient flexibility of the pigtail. Also, the strength of the brush holding member and the stability of holding of the brush are secured. Furthermore, the brush apparatus is easily manufactured because the plurality of lead wires are welded at one time, and only one insulation tube is necessary. Also, increase in number of components is restrained, which contributes to cost reduction.

Various modifications and alterations of the invention will be apparent to those skilled in the art without departing from the scope and spirit of the invention, and it should be understood that this is not limited to the illustrative embodiments set forth herein.

What is claimed is:

1. A brush apparatus comprising:

a brush having a rectangular solid shape and coming into sliding contact with a commutator which is connected to an armature coil; and a brush holder that holds the brush, wherein the brush includes a pigtail having a plurality of lead wires tightly bonded into a flat shape, wherein the pigtail is embedded in the brush at a substantially widthwise center of a wider side thereof that extends orthogonally to a surface of the brush which comes into contact with the commutator in such a manner that the longitudinal side in cross-section of the pigtail extends in parallel with the surface of the brush which comes into contact with the commutator, wherein the brush holder includes:

a brush holding member for storing the brush;

a brush spring for pressing a surface of the brush opposite from the surface which comes into contact with the commutator against the commutator in order to bring the brush into sliding contact with the commutator, a base for holding the brush holding member and electrically connecting the same to a ground circuit, and a connection lug provided on the base, wherein the brush holding member includes a notch formed on a wider side thereof by trimming away the brush holding member from an upper end thereof for allowing a downward movement of the pigtail when the brush wears and hence is pressed downward, and wherein a distal end of the pigtail is connected to the connection lug.

2. The brush apparatus according to claim 1, wherein the size of the pigtail in the longitudinal direction of the cross-section thereof is 50% or lower of the size of the width of the wider side of the brush in which the pigtail is embedded.

3. The brush apparatus according to claim 1, wherein the distal end of the pigtail including the plurality of lead wires is fixed to the connection lug of the base in a lump by welding or brazing.

4. The brush apparatus according to claim 1, wherein the pigtail including the plurality of lead wires is insulated and protected by a single insulation tube.

* * * * *